(12) United States Patent
Park et al.

(10) Patent No.: US 10,446,807 B2
(45) Date of Patent: Oct. 15, 2019

(54) SECONDARY BATTERY

(71) Applicant: SAMSUNG SDI CO., LTD., Yongin-si, Gyeonggi-do (KR)

(72) Inventors: Seunghee Park, Yongin-si (KR); Jeawoan Lee, Yongin-si (KR); Youngchang Lim, Yongin-si (KR); Soomi Eo, Yongin-si (KR); Jaemin Lim, Yongin-si (KR); Kyunghoon Cho, Yongin-si (KR); Euysun Jung, Yongin-si (KR); Kwonchul Kim, Yongin-si (KR); Kyung Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 65 days.

(21) Appl. No.: 15/258,974

(22) Filed: Sep. 7, 2016

(65) Prior Publication Data

US 2017/0288182 A1 Oct. 5, 2017

(30) Foreign Application Priority Data

Apr. 4, 2016 (KR) ........................ 10-2016-0004112

(51) Int. Cl.
*H01M 2/06* (2006.01)
*H01M 10/0525* (2010.01)
*H01M 10/058* (2010.01)
*H01M 2/30* (2006.01)

(52) U.S. Cl.
CPC ............... *H01M 2/06* (2013.01); *H01M 2/30* (2013.01); *H01M 10/058* (2013.01); *H01M 10/0525* (2013.01); *H01M 2220/20* (2013.01); *H01M 2220/30* (2013.01)

(58) Field of Classification Search
None
See application file for complete search history.

(56) References Cited

U.S. PATENT DOCUMENTS

2010/0055558 A1    3/2010  Choi et al.
2011/0129711 A1*   6/2011  Ahn ..................... H01M 2/30
                                                 429/94
2011/0305945 A1*  12/2011  Tada ..................... H01M 2/06
                                                 429/179

FOREIGN PATENT DOCUMENTS

JP    2004-39651 A      2/2004
JP    2015-79654 A      4/2015
KR    10-2007-0099430 A  10/2007

* cited by examiner

*Primary Examiner* — Wyatt P McConnell
(74) *Attorney, Agent, or Firm* — Lewis Roca Rothgerber Christie LLP

(57) ABSTRACT

A secondary battery includes: an electrode assembly, a case accommodating the electrode assembly, and an electrode tab electrically connected to the electrode assembly and extending from inside of the electrode assembly to outside of the case. The electrode tab has different thicknesses at the inside of the electrode assembly and the outside of the electrode assembly.

11 Claims, 4 Drawing Sheets

SECONDARY BATTERY

CROSS-REFERENCE TO RELATED APPLICATION

This application claims priority to and the benefit of Korean Patent Application No. 10-2016-0004112, filed on Apr. 4, 2016 in the Korean Intellectual Property Office, and all the benefits accruing therefrom under 35 U.S.C. § 119, the entire content of which is herein incorporated by reference.

BACKGROUND

1. Field

Embodiments of the present invention relate to a secondary battery.

2. Description of the Related Art

Unlike primary batteries which are not designed to be rechargeable, secondary rechargeable batteries are designed to be charged and discharged. Low-capacity secondary batteries having a single electrode assembly packaged in the form of a pack are widely employed in small, portable electronic devices, such as cellular phones, camcorders, and the like, while large-capacity secondary batteries having several tens of electrode assemblies connected to each other are typically used for driving motors of electric scooters, electric automobiles, or hybrid automobiles.

Secondary batteries can be manufactured in various shapes. For example, a pouch type battery includes an electrode assembly formed by installing a separator as an insulator between a positive electrode plate and a negative electrode plate, a thin, flexible pouch case accommodating the electrode assembly, and an electrode tab connected to the electrode assembly and drawn (or extending) from the inside to the outside of the pouch case. The pouch case accommodates the electrode assembly in an internal space formed by welding edge portions of the pouch case to each other.

SUMMARY

Embodiments of the present invention provide a secondary battery having a relatively thin electrode assembly and a relatively high capacity while maintaining stiffness of an electrode tab.

The above and other aspects of embodiments of the present invention will be described in or will be apparent from the following description of exemplary embodiments thereof.

According to an embodiment of the present invention, a secondary battery includes an electrode assembly; a case accommodating the electrode assembly; and an electrode tab electrically connected to the electrode assembly and extending from inside of the electrode assembly to outside of the case. The electrode tab has different thicknesses at the inside of the electrode assembly and the outside of the electrode assembly.

A thickness of a portion of the electrode tab at the inside of the electrode assembly may be less than that of a portion of the electrode tab at the outside of the electrode assembly.

The electrode tab may include only a single layer at the inside of the electrode assembly and may include two layers at the outside of the electrode assembly.

The electrode tab may include a single metal layer at the inside of the electrode assembly and may include dissimilar metal layers at the outside of the electrode assembly.

The electrode tab may include a main tab portion extending from the inside of the electrode assembly to the outside of the case, and an auxiliary tab portion welded to a portion of the main tab portion.

The auxiliary tab portion may be at the outside of the electrode assembly.

The main tab portion may include an internal tab portion at the inside of the electrode assembly and an external tab portion at the outside of the electrode assembly, and the auxiliary tab portion may be welded to the external tab portion.

A thickness of the main tab portion may be less than that of the auxiliary tab portion.

The main tab portion and auxiliary tab portion may be configured to have a thickness ratio of about 3:5.

The auxiliary tab portion may include nickel.

The main tab portion and the auxiliary tab portion may have a clad structure.

As described above, a secondary battery according to embodiments of the present invention includes an electrode tab having different thicknesses at the inside and outside of an electrode assembly, thereby reducing the thickness of the electrode assembly and/or increasing the capacity thereof while maintaining the stiffness of the electrode tab.

BRIEF DESCRIPTION OF THE DRAWINGS

The above and other features of the present invention will become more apparent by describing, in detail, exemplary embodiments thereof with reference to the attached drawings in which.

DETAILED DESCRIPTION

Figure 1:
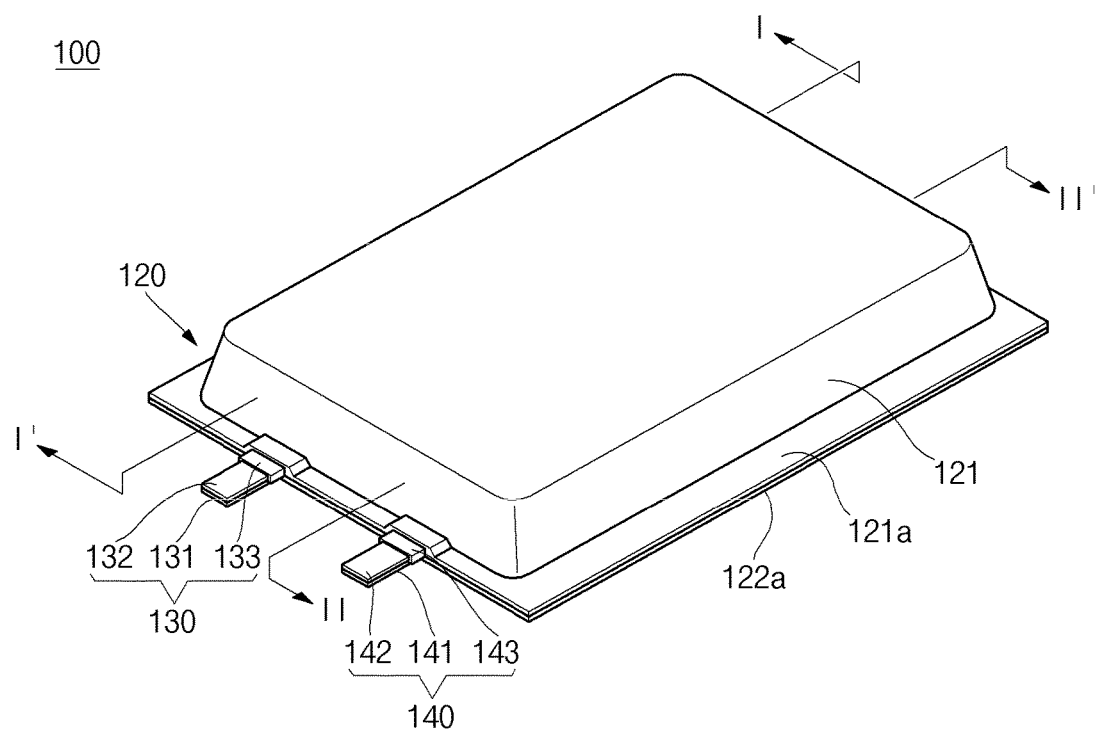
FIG. 1 is a perspective view of a secondary battery according to an embodiment of the present invention.

Hereinafter, exemplary embodiments of the present invention will be described, in detail, with reference to the accompanying drawings such that they can easily be made and used by those skilled in the art. The present invention may, however, be embodied in many different forms and should not be construed as being limited to the embodiments set forth herein. Rather, these exemplary embodiments are provided so that this disclosure will be thorough and complete and will fully convey the concept of the present invention to those skilled in the art. The present invention will be defined by the appended claims and their equivalents.

In the drawings, thicknesses of layers and regions may be exaggerated for clarity. Like numbers refer to like elements throughout. As used herein, the term "and/or" includes any and all combinations of one or more of the associated listed items.

The terminology used herein is for the purpose of describing particular embodiments and is not intended to be limiting of the present invention. As used herein, the singular forms are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof. It will be further understood that when an element or layer is referred to as being "on," "connected to," or "coupled to" another element or layer, it may be directly on, connected, or coupled to the other element or layer or one or more intervening elements or layers may also be present. When an element is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements. Further, the use of "may" when describing embodiments of the present invention relates to "one or more embodiments of the present invention." Expressions, such as "at least one of," when preceding a list of elements, modify the entire list of elements and do not modify the individual elements of the list. Also, the term "exemplary" is intended to refer to an example or illustration. As used herein, the terms "use," "using," and "used" may be considered synonymous with the terms "utilize," "utilizing," and "utilized," respectively.

It will be understood that, although the terms first, second, etc. may be used herein to describe various members, elements, regions, layers, and/or sections, these members, elements, regions, layers, and/or sections should not be limited by these terms. These terms are used to distinguish one member, element, region, layer, and/or section from another. Thus, for example, a first member, a first element, a first region, a first layer, and/or a first section discussed below could be termed a second member, a second element, a second region, a second layer, and/or a second section without departing from the teachings.

Spatially relative terms, such as "below," "beneath," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "on" or "above" the other elements or features. Thus, the exemplary term "below" can encompass both an orientation of above and below.

Figure 2A:
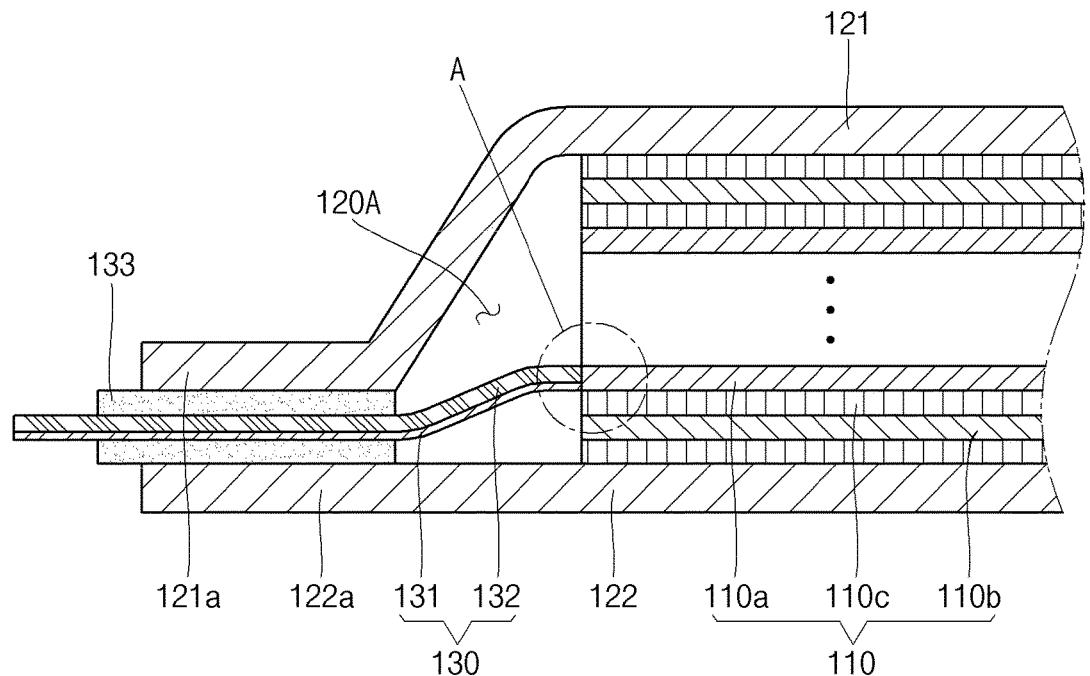
FIG. 2A is a partial sectional view taken along the line I-I' of FIG. 1.
Figure 2B:
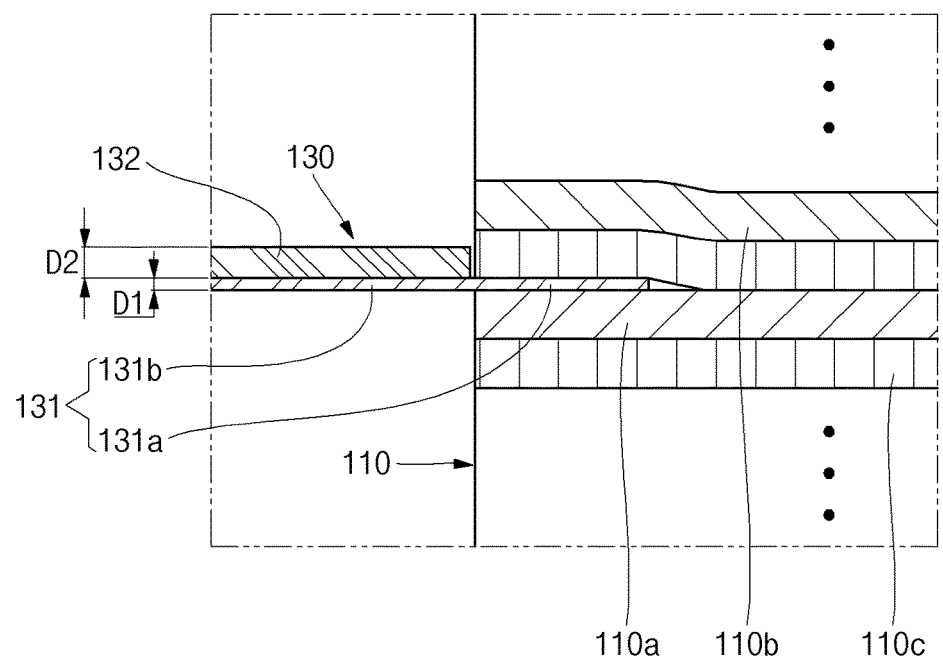
FIG. 2B is an enlarged sectional view of the portion A of FIG. 2A.

FIG. 1 is a perspective view of a secondary battery according to an embodiment of the present invention, FIG. 2A is a partial sectional view taken along the line I-I' of FIG. 1, and FIG. 2B is an enlarged sectional view of the portion A of FIG. 2A.

Figure 3A:
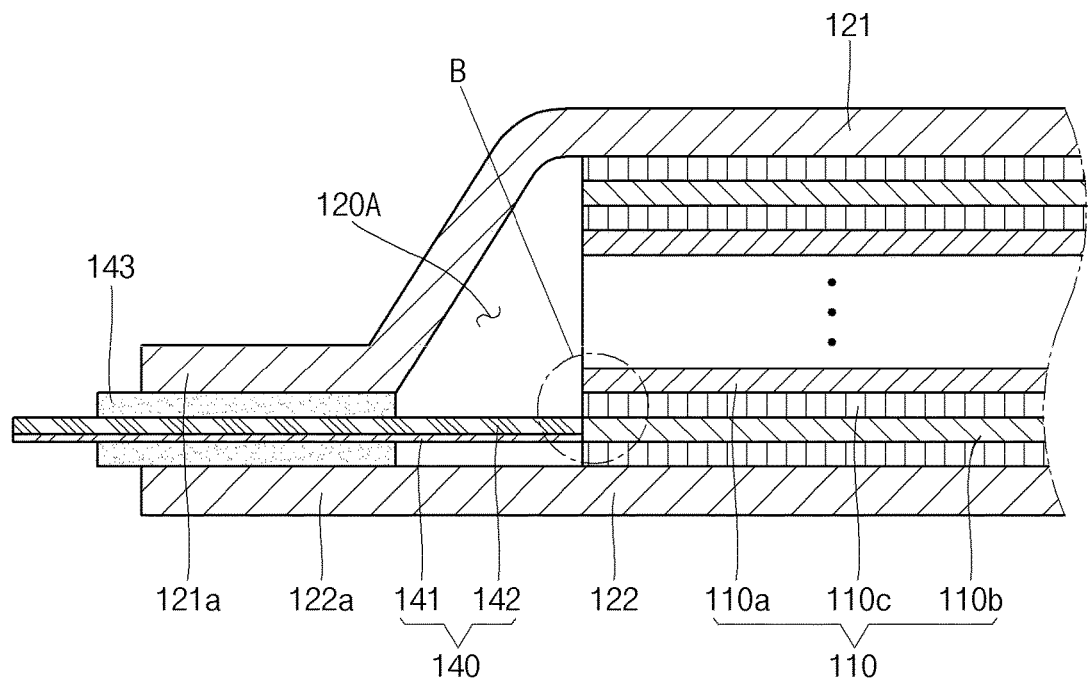
FIG. 3A is a partial sectional view taken along the line II-II' of FIG. 1.
Figure 3B:
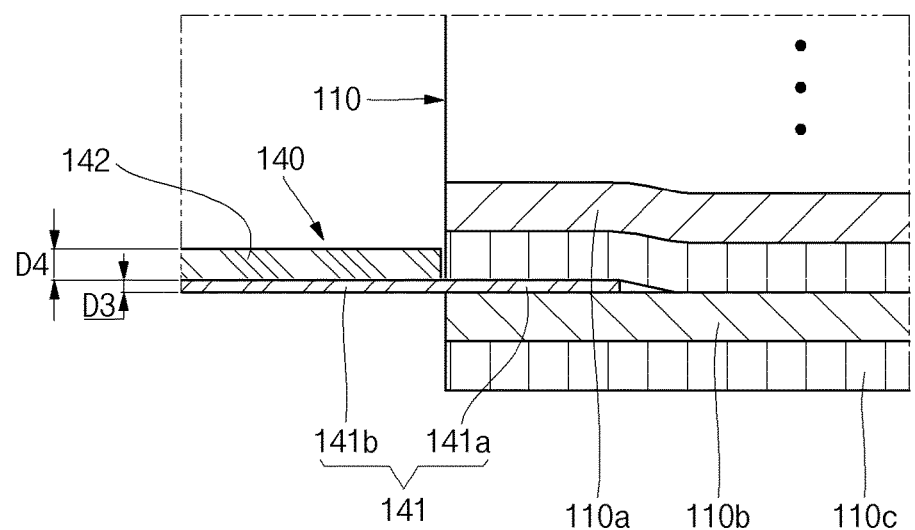
FIG. 3B is an enlarged sectional view of the portion B of FIG. 3A.

FIG. 3A is a partial sectional view taken along the line II-II' of FIG. 1, and FIG. 3B is an enlarged sectional view of the portion B of FIG. 3A.

Referring to FIGS. 1-3B, a secondary battery 100 according to an embodiment of the present invention includes an electrode assembly 110, a case 120, a first electrode tab 130, and a second electrode tab 140.

The electrode assembly 110 may be formed by winding or laminating a stacked structure of a first electrode plate 110a, a separator 110c, and a second electrode plate 110b, which are each thin plates or layers. In one embodiment, the first electrode plate 110a may function as a positive electrode, and the second electrode plate 110b may function as a negative electrode. However, embodiments of the present invention are not limited thereto, and in other embodiments, the first electrode plate 110a may function as the negative electrode, and the second electrode plate 110b may function as the positive electrode.

The first electrode plate 110a may be formed by coating a first electrode active material, such as a transition metal oxide, on a first electrode current collector formed of a metal foil, such as aluminum, and may include a first electrode uncoated portion that is not coated with the first electrode active material. A first electrode tab 130, to be further described later, may be formed on or connected to the first electrode uncoated portion of the first electrode plate 110a. For example, one end of the first electrode tab 130 is connected to the first electrode uncoated portion, and the other end of the first electrode tab 130 is drawn to the outside of the case 120.

The second electrode plate 110b may be formed by coating a second electrode active material, such as graphite or carbon, on a second electrode current collector formed of a metal foil, such as nickel or copper, and may include a second electrode uncoated portion that is not coated with the second electrode active material. A second electrode tab 140, to be further described later, may be formed on the second electrode uncoated portion of the second electrode plate 110b. For example, one end of the second electrode tab 140 is connected to the second electrode uncoated portion, and the other end of the second electrode tab 140 is drawn to the outside of the case 120.

The first electrode plate 110a and the second electrode plate 110b have different polarities from each other. For example, the first electrode plate 110a may function as a positive electrode, and the second electrode plate 110b may function as a negative electrode. However, embodiments of the present invention are not limited thereto, and in other embodiments, the first electrode plate 110a may function as the negative electrode, and the second electrode plate 110b may function as the positive electrode.

The separator 110c is interposed between the first electrode plate 110a and the second electrode plate 110b to prevent a short circuit therebetween while allowing movement of lithium ions therebetween. The separator 110c may be formed of polyethylene (PE), polypropylene (PP), or a composite film of PE and PP.

The electrode assembly 110 is accommodated in the case 120 with an electrolyte. The electrolyte may include an organic solvent, such as ethylene carbonate (EC), propylene carbonate (PC), diethyl carbonate (DEC), ethyl methyl carbonate (EMC), and/or dimethyl carbonate (DMC), and a lithium salt, such as $LiPF_6$ or $LiBF_4$. In addition, the electrolyte can be a liquid, solid, and/or gel electrolyte.

The case 120 may generally include a pouch body 121 and a pouch cover 122 folded in a lengthwise direction along one side of an integrally formed layer (e.g., a layer common to both the pouch body 121 and the pouch cover 122) to form a rectangular pouch. In some embodiments, the pouch case 120 may include separate pouch layers having folded portions such that the pouch body 121 and the pouch cover 122 are separate from each other rather than being integrally formed with each other as in other embodiments.

The pouch body 121 includes an accommodating portion 120A that is a space for accommodating the electrode assembly 110. The accommodating portion 120A may be formed by pressing a rectangular pouch layer by applying a pressure thereto with a mold frame having a shape which corresponds to the accommodating portion 120A. The pouch body 121 may be formed to have a substantially hexagonal shape having an opening in which one face is opened (e.g., an opening portion) by forming the accommodating portion 120A through the above-described process. In addition, the pouch body 121 may include a first sealing portion 121a extending along the outside of the accommodating portion 120A along a periphery of (e.g., along a peripheral portion of) the pouch body 121.

The pouch cover 122 is formed in a substantially rectangular panel shape and may cover the opening portion of the pouch body 121. In addition, the pouch cover 122 may include a second sealing portion 122a extending along the outside of the accommodating portion 120A along a periphery of (e.g., along a peripheral portion of) the pouch cover 122.

The first sealing portion 121a and the second sealing portion 122a may correspond to each other and may have planar band shapes. In addition, the first sealing portion 121a and the second sealing portion 122a may be welded to each other by thermal fusion, thereby sealing the accommodating portion 120A.

The first electrode tab 130 may be electrically connected to the first electrode plate 110a and may be drawn from the inside to the outside of the accommodating portion 120A through the first and second sealing portions 121a and 122a. In some embodiments, the first electrode tab 130 includes a first main tab portion 131 and a first auxiliary tab portion 132. For convenience of illustration, the first electrode tab 130 is shown as extending from an end of the first electrode plate 110a in FIG. 2A to represent that the first electrode tab 130 is connected to the first electrode plate 110a. However, as shown in FIG. 2B, the first electrode tab 130 may extend toward the outside of the electrode assembly 110 in a state in which a portion of the first electrode tab 130 is in contact with a region of the first electrode plate 110a.

The first main tab portion 131 may form a base (e.g., a base part or a base portion) of the first electrode tab 130. The first main tab portion 131 has a plate shape having a constant or substantially constant thickness and width as a whole. One end of the first main tab portion 131 is connected to the first electrode uncoated portion of the first electrode plate 110a (e.g., the first main tab portion 131 is electrically connected to the first electrode plate 110a). In addition, the other end of the first main tab portion 131 is drawn to the outside of the case 120 through the first and second sealing portions 121a and 122a.

Referring to FIG. 2B, the first main tab portion 131 includes a first internal tab portion 131a positioned inside the electrode assembly 110 and a first external tab portion 131b positioned outside the electrode assembly 110. For example, in some embodiments, the first internal tab portion 131a is a portion of the first main tab portion 131 that is in direct contact to be electrically connected with the first electrode uncoated portion, and the first external tab portion 131b is a portion of the first main tab portion 131 that extends from the first internal tab portion 131a to the outside of the electrode assembly 110.

The first auxiliary tab portion 132 is welded to the first main tab portion 131 at or from the outside of the electrode assembly 110. For example, the first auxiliary tab portion 132 is welded to the first external tab portion 131b to extend from the accommodating portion 120A to the outside of the case 120. The first auxiliary tab portion 132 has a plate shape having a constant or substantially constant thickness and width as a whole.

The first main tab portion 131 and the first auxiliary tab portion 132 may have the same or substantially the same width. For example, the first auxiliary tab portion 132 may cover (e.g., may completely cover) a top surface of the first external tab portion 131b of the first main tab portion 131.

A thickness of the first main tab portion 131 may be less than that of the first auxiliary tab portion 132. For example, in order to reduce or minimize the thickness of the electrode assembly 110 and/or to increase or maximize the capacity of the electrode assembly 110, the first main tab portion 131 positioned inside the electrode assembly 110 has a relatively small thickness. For example, the first main tab portion 131 and the first auxiliary tab portion 132 are, in some embodiments, configured to have a thickness ratio of about 3:5 (D1:D2). For example, when the first main tab portion 131 has a thickness D1 of 30 μm, the first auxiliary tab portion 132 may have a thickness D2 of 50 μm.

As described above, the first electrode tab 130 is formed to have different thicknesses inside and outside the electrode assembly 110. For example, the first electrode tab 130 may have a relatively small thickness inside the electrode assembly 110 while having a relatively large thickness outside the electrode assembly 110. In some embodiments, only the first main tab portion 131 having the relatively small thickness, such as the first internal tab portion 131a, is positioned inside the electrode assembly 110. In addition, the first auxiliary tab portion 132 is welded to the first main tab portion 131, such as to the first external tab portion 131b, outside the electrode assembly 110. In some embodiments, because the first electrode tab 130 positioned inside the electrode assembly 110 includes only a single layer (e.g., consists of a single layer), it has a relatively small thickness. And, because the first electrode tab 130 positioned outside the electrode assembly 110 includes two or more layers, it has a relatively large thickness.

Therefore, because the thickness of the first electrode tab 130 is reduced or minimized inside the electrode assembly 110, the overall thickness of the electrode assembly 110 can be reduced. In addition, because the thickness of the electrode assembly 110 occupied by the first electrode tab 130 is reduced or minimized, the capacity of the electrode assembly 110 according to embodiments of the present invention can be improved compared to generally (or conventionally) formed electrode assemblies. Moreover, because the first electrode tab 130 includes two or more layers outside the electrode assembly 110, the stiffness of the first electrode tab 130 can be maintained or improved.

In the above-described embodiment, the first electrode tab 130 acting as the positive electrode tab has been described. In this embodiment, the first main tab portion 131 may include aluminum, and the first auxiliary tab portion 132 may include nickel. Therefore, the first electrode tab 130 (e.g., the portion of the first electrode tab 130) outside of the electrode assembly 110 may be formed to have a clad structure in which dissimilar metal plates are mechanically welded to each other.

The first electrode tab 130 may further include a first insulation tape 133 surrounding (e.g., surrounding a periphery of) the first main tab portion 131 and the first auxiliary tab portion 132. The first insulation tape 133, interposed between the first sealing portion 121a and the second sealing portion 122*a*, may prevent an unnecessary or unintended short circuit between the first electrode tab 130 and the case 120.

The second electrode tab 140 may be electrically connected to the second electrode plate 110*b* and may be drawn from (e.g., may extend from) the inside to the outside of the accommodating portion 120A through the first and second sealing portions 121*a* and 122*a*. In some embodiments, the second electrode tab 140 includes a second main tab portion 141 and a second auxiliary tab portion 142. For convenience of description, the second electrode tab 140 is illustrated as extending from an end of the second electrode plate 110*b* in FIG. 3A in order to represent the second electrode tab 140 being connected to the second electrode plate 110*b*. However, as shown in FIG. 3B, the second electrode tab 140 may extend toward the outside of the electrode assembly 110 in a state in which a portion of the second electrode tab 140 is in contact with a region (e.g., a surface region) of the second electrode plate 110*b*.

The second main tab portion 141 may from a base (e.g., a base part or base portion) of the second electrode tab 140. The second main tab portion 141 has a plate shape having a constant or substantially constant thickness and width as a whole. One end of the second main tab portion 141 is connected to the second electrode uncoated portion of the second electrode plate 110*b* (e.g., the second main tab portion 141 is electrically connected to the second electrode plate 110*b*). In addition, the other end of the second main tab portion 141 is drawn to the outside of the case 120 through the first and second sealing portions 121*a* and 122*a*.

Referring to FIG. 3B, the second main tab portion 141 includes a second internal tab portion 141*a* positioned inside the electrode assembly 110 and a second external tab portion 141*b* positioned outside the electrode assembly 110. For example, the second internal tab portion 141*a* is a portion of the second main tab portion 141 that is brought into direct contact to be electrically connected with the second electrode uncoated portion, and the second external tab portion 141*b* is a portion of the second main tab portion 141 extending from the second internal tab portion 141*a* to the outside of the electrode assembly 110.

The second auxiliary tab portion 142 is welded to the second main tab portion 141 at or from the outside of the electrode assembly 110. For example, the second auxiliary tab portion 142 is welded to the second external tab portion 141*b* to extend from the accommodating portion 120A to the outside of the case 120. The second auxiliary tab portion 142 has a plate shape having a constant or substantially constant thickness and width as a whole.

The second main tab portion 141 and the second auxiliary tab portion 142 may have the same or substantially the same width. For example, the second auxiliary tab portion 142 may cover (e.g., completely cover) a top surface of the second external tab portion 141*b* of the second main tab portion 141.

A thickness of the second main tab portion 141 may be less than that of the second auxiliary tab portion 142. For example, in order to reduce or minimize the thickness of the electrode assembly 110 and/or to increase or maximize the capacity of the electrode assembly 110, the second main tab portion 141 positioned inside the electrode assembly 110 has a relatively small thickness. In some embodiments, the second main tab portion 141 and the second auxiliary tab portion 142 are configured to have a thickness ratio of about 3:5 (D3:D4). For example, when the second main tab portion 141 has a thickness D3 of 30 μm, the second auxiliary tab portion 142 may have a thickness D4 of 50 μm.

As described above, the second electrode tab 140 is formed to have different thicknesses inside and outside the electrode assembly 110. For example, the second electrode tab 140 may have a relatively small thickness inside the electrode assembly 110 while having a relatively large thickness outside the electrode assembly 110. In some embodiments, only the second main tab portion 141 having the relatively small thickness, such as the second internal tab portion 141*a*, is positioned inside the electrode assembly 110. In addition, the second auxiliary tab portion 142 is welded to the second main tab portion 141, such as to the second external tab portion 141*b*, outside the electrode assembly 110. Because the second electrode tab 140, in some embodiments, positioned inside the electrode assembly 110 includes only a single layer (e.g., consists of a single layer), it has a relatively small thickness, and because the second electrode tab 140 positioned outside the electrode assembly 110 includes two or more layers, it has a relatively large thickness.

Therefore, because the thickness of the second electrode tab 140 is reduced or minimized inside the electrode assembly 110, the overall thickness of the electrode assembly 110 can be reduced. In addition, because the thickness of the electrode assembly 110 occupied by the second electrode tab 140 is reduced or minimized, the capacity of the electrode assembly 110 according to embodiments of the present invention can be improved compared to generally (or conventionally) formed electrode assemblies having the same thickness. Moreover, because the second electrode tab 140 includes two or more layers outside the electrode assembly 110, the stiffness of the second electrode tab 140 can be maintained or improved.

In the above-described embodiment, the second electrode tab 140 has been described as the negative electrode tab. In this embodiment, the second main tab portion 141 may include aluminum, and the second auxiliary tab portion 142 may include nickel. Therefore, outside the electrode assembly 110, the second electrode tab 140 may have a clad structure in which dissimilar metal plates are mechanically welded to each other.

The second electrode tab 140 may further include a second insulation tape 143 surrounding (e.g., surrounding a periphery of) the second main tab portion 141 and the second auxiliary tab portion 142. The second insulation tape 143, interposed between the first sealing portion 121*a* and the second sealing portion 122*a*, may prevent an unnecessary or unintended short circuit between the second electrode tab 140 and the case 120.

FIGS. 4A-4E illustrate a sequence of forming a first electrode tab according to an embodiment of the present invention.

Figure 4A:
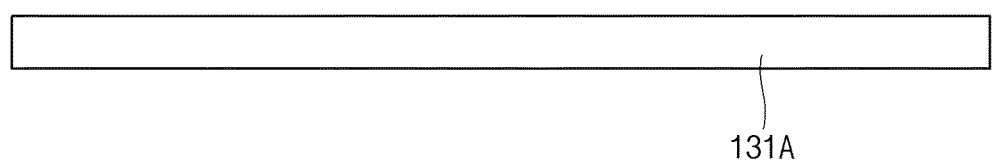
FIGS. 4A-4E illustrate a sequence of forming a first electrode tab according to an embodiment of the present invention.

First, as shown in FIG. 4A, the first electrode tab 130 may include a first main electrode member 131A. In some embodiments, the first main electrode member 131A has a plate shape having the same or substantially the same width (e.g., having the same or substantially the same length along a short side) and thickness as a whole. The first main electrode member 131A may include copper and may have a thickness of about 30 μm, but embodiments of the present invention are not limited thereto.

Figure 4B:
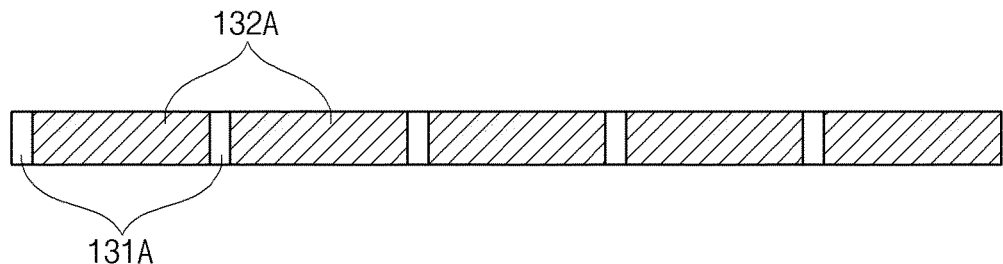

Next, as shown in FIG. 4B, a first auxiliary electrode member 132A may be welded to the first main electrode member 131A at a constant interval by rolling or welding. In some embodiments, the first auxiliary electrode member 132A may cover a top surface of the first main electrode member 131A while having the same or substantially the same width (e.g., having the same or substantially the same length along a short side) as the first main electrode member 131A. The first auxiliary electrode member 132A may include nickel and may have thickness of about 50 μm, but embodiments of the present invention are not limited thereto.

Figure 4C:
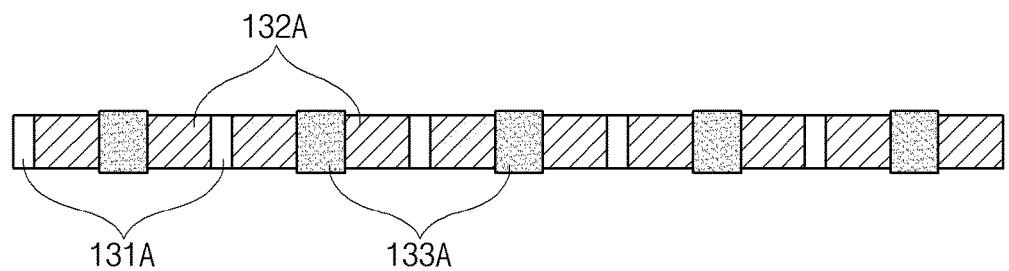

As shown in FIG. 4C, portions of the first main electrode member 131A and the first auxiliary electrode member 132A are surrounded by the insulation tape 133. In some embodiments, the insulation tape 133 may be adhered to be aligned on the basis of one end of the first auxiliary electrode member 132A.

Figure 4D:
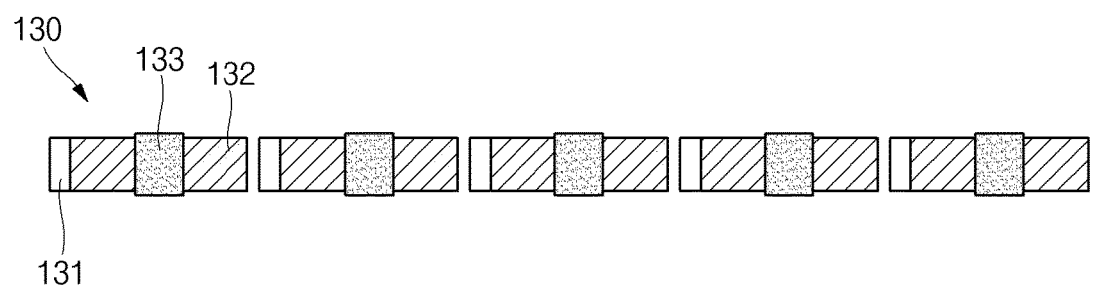

Next, as shown in FIG. 4D, the first main electrode member 131A having the first auxiliary electrode member 132A welded thereto is cut at a constant interval to form a plurality of first electrode tabs 130. In some embodiments, the first main electrode member 131A may be cut on the basis of the other end of the first auxiliary electrode member 132A.

Figure 4E:
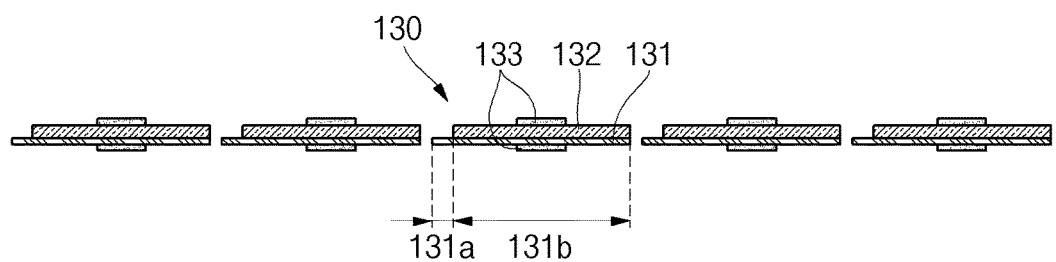

The thusly-formed first electrode tab 130 may include the first main tab portion 131, the first auxiliary tab portion 132 welded to the first main tab portion 131, and the insulation tape 133 surrounding portions of the first main tab portion 131 and the first auxiliary tab portion 132, as shown in FIG. 4E. In some embodiments, the first main tab portion 131 may include the first internal tab portion 131a to be connected to the first electrode plate 110a inside the electrode assembly 110. In addition, the first main tab portion 131 may further include the first external tab portion 131b extending from the first internal tab portion 131a to be positioned outside the electrode assembly 110. The first auxiliary tab portion 132 may be welded to the first external tab portion 131b.

While the first electrode tab 130 and the second electrode tab 140 are made of different metals depending on the polarity, they are formed in the same or substantially the same manner. Thus, a detailed description of the sequence of forming the second electrode tab 140 may not be provided.

As described above, in the secondary battery 100 according to an embodiment of the present invention, the first electrode tab 130 and/or the second electrode tab 140 may be configured to have different thicknesses inside and outside the electrode assembly 110. For example, the first and second electrode tabs 130 and 140 respectively include main tab portions 131 and 141 and auxiliary tab portions 132 and 142 welded to portions of the main tab portions 131 and 141. In some embodiments, regions of the electrode tabs 130 and 140 consisting of only the main tab portions 131 and 141 (e.g., only the main tab portions 131 and 141) are positioned inside the electrode assembly 110, and regions of the electrode tabs 130 and 140 welded to the main tab portions 131 and 141 and the auxiliary tab portions 132 and 142 are positioned outside the electrode assembly 110.

Therefore, the thicknesses of the electrode tabs 130 and 140 positioned within the electrode assembly 110 can be reduced or minimized, thereby reducing the overall thickness of the electrode assembly 110 while increasing the capacity of the electrode assembly 110. While the electrode tabs 130 and 140 have relatively small thicknesses inside the electrode assembly 110, they include two or more layers outside the electrode assembly 110, thereby maintaining the stiffness of each of the electrode tabs 130 and 140 and preventing the electrode tabs 130 and 140 from being damaged or reducing the occurrence of damage to the electrode tabs 130 and 140.

While embodiments of a secondary battery according to the present invention have been particularly shown and described, it will be understood by those of ordinary skill in the art that various changes in form and details may be made therein without departing from the spirit and scope of the present invention as defined by the following claims and their equivalents.

What is claimed is:

1. A secondary battery comprising:
   an electrode assembly;
   a case accommodating the electrode assembly; and
   an electrode tab electrically connected to the electrode assembly,
   wherein the electrode tab has different thicknesses at a first portion inside of the electrode assembly and at a second portion outside of the electrode assembly, the second portion having a substantially uniform thickness, the second portion having an edge adjacent the electrode assembly, and
   wherein the second portion of the electrode tab extends from inside of the case to outside of the case.

2. The secondary battery of claim 1, wherein the thickness of the first portion of the electrode tab at the inside of the electrode assembly is less than that of the second portion of the electrode tab at the outside of the electrode assembly.

3. The secondary battery of claim 1, wherein the electrode tab comprises only a single layer at the inside of the electrode assembly and comprises two layers at the outside of the electrode assembly.

4. The secondary battery of claim 3, wherein the electrode tab comprises a single metal layer at the inside of the electrode assembly and comprises dissimilar metal layers at the outside of the electrode assembly.

5. A secondary battery comprising:
   an electrode assembly;
   a case accommodating the electrode assembly; and
   an electrode tab electrically connected to the electrode assembly and extending from inside of the electrode assembly to outside of the case, the electrode tab having different thicknesses at the inside of the electrode assembly and the outside of the electrode assembly,
   wherein the electrode tab comprises:
      a main tab portion extending from the inside of the electrode assembly to the outside of the case; and
      an auxiliary tab portion welded to a portion of the main tab portion and extending from the inside of the case to the outside of the case.

6. The secondary battery of claim 5, wherein the main tab portion comprises:
   an internal tab portion at the inside of the electrode assembly; and
   an external tab portion at the outside of the electrode assembly, and
   wherein the auxiliary tab portion is welded to the external tab portion.

7. The secondary battery of claim 5, wherein a thickness of the main tab portion is less than that of the auxiliary tab portion.

8. The secondary battery of claim 5, wherein the main tab portion and auxiliary tab portion are configured to have a thickness ratio of about 3:5.

9. The secondary battery of claim 5, wherein the auxiliary tab portion comprises nickel.

10. The secondary battery of claim 5, wherein the main tab portion and the auxiliary tab portion have a clad structure.

11. The secondary battery of claim 1, wherein the electrode tab comprises:
a main tab portion extending from the inside of the electrode assembly to the outside of the case; and
an auxiliary tab portion welded to a portion of the main tab portion.

* * * * *